United States Patent Office 2,981,682
Patented Apr. 25, 1961

2,981,682

CHLORINATION OF WATER SOLUBLE IRON CYANIDE COMPOUNDS USING MERCURIC CHLORIDE CATALYST

Leslie E. Lancy, Ellwood City, Pa., assignor to Lancy Laboratories, Inc., Zelienople, Pa., a corporation of Pennsylvania No Drawing. Filed Mar. 6, 1959, Ser. No. 797,569

18 Claims. (Cl. 210—62)

This invention relates to the conditioning of waste materials, such as waste waters, and particularly, to converting toxic cyanide compounds into non-toxic compounds such that the material may, for example, be freely discharged into a stream, without endangering living organisms, including fish.

A phase of the invention relates to the treatment of alkali metal salts of alkali metal iron cyanide compounds, such as those containing sodium potassium, calcium, etc.

Cyanide compounds are often used in many processes, including metal finishing, heat treating and wet mining. The toxic effect of metal cyanides is well known, and although iron cyanide compounds have been considered non-toxic, it has been determined that when they are discharged into the open, as into a stream, they tend to reconvert into simple cyanide compounds, due to the action of sunlight (photo effect). Thus, iron cyanides that, in themselves, are not toxic become hazardous when they break down and liberate free cyanide.

Waste waters discharged from processes, such as those above mentioned, usually require chemical treatment for the eliminating of the cyanide compounds, and the most commonly used process is alkaline chlorination of the waste. This involves treatment with chlorine gas or hypochlorites at an alkaline pH. This results in the conversion of the cyanide compounds into far less toxic cyanate compounds which may then be further chlorinated to accomplish a final breakdown into carbon dioxide and nitrogen gases. In some metal finishing processes, heat treatments, blast furnace or coke oven gas scrub water and mining flotation and leaching, I have found that where iron is present, the cyanide chemicals react therewith to form iron cyanides. Although iron cyanide compounds do not have very tight chemical bonds, they are not oxidized or broken down by the alkaline chlorination method which is the usual treatment for the other compounds.

It has thus been an object of my invention to devise a treatment, composition and procedure for eliminating iron cyanides and thus eliminating cyanide contamination, due to their photo decomposition;

Another object of my invention has been to provide a practical and relatively inexpensive and simple procedure for eliminating iron cyanides where they exist alone or are present in wastes, waters or aqueous solutions containing other cyanides;

A still further object of my invention has been to make or convert iron cyanides into simple cyanides, so that that they will be amenable to common chemical treatments, such as alkaline chlorination;

These and other objects of my invention will appear to those skilled in the art from the specification and claims.

In endeavoring to device a solution to the problem involved in connection with the formation of iron cyanide salts with and without other cyanide salts or compounds, I took into consideration the possibility of precipitating the iron cyanides with heavy metals, such as iron, nickel, copper, zinc, etc. under acidic conditions, and also subjecting the wastes to ultraviolet radiation. However, these methods are a time-consuming and expensive way and further, are not fully satisfactory where, as often is the case, the iron cyanide compounds are a constituent of the same waste that is also to be treated for its other cyanide content.

I have determined that a solution has to be acidified to precipitate iron cyanides, where it was before made alkaline to remove simple alkaline cyanides with chlorine. In view of the large amount of carbonates present, this tends to consume a considerable amount of acid. It will be noted that acidification cannot be started before the simple cyanides are chlorinated, since otherwise highly toxic hydrocyanic gas is formed, due to the mixing of the acid and cyanide salts. Also, metal iron cyanide complexes thus produced are colored and are objectionable from this standpoint and from the standpoint of the turbidity of the effluent. Finally, the acidic waste has to be neutralized as a final step. On the other hand, ultraviolet treatment is time-consuming, costly and of poor efficiency when dealing with turbid waste effluents that tend to screen out too much of the short wave length light out of the body of liquid.

I set out to devise an approach to the problem which would make possible a substantially progressive and preferential treatment process that has constituents that, in effect, selectively condition the cyanide content thereof without waste, with a minimum use of chemicals, and regardless of whether or not other cyanides are present with the iron cyanides or compounds.

I discovered that mercury salts are capable of splitting iron cyanides in a catalytic process, if the decomposition is coupled with the alkaline chlorination. This treatment process can be accomplished in an economical manner using only a small quantity of mercury salts, which small amount is employed until the breakdown of iron cyanides is completed. The mercury salts may be recovered when the treatment of a particular batch has been completed. The chemical reaction is exemplified by (1) the formation of mercury cyanide, by (2) reaction-chlorinating the cyanide and forming mercury chloride, and by repeating the cycle of mercury cyanide formation:

(1) $2Na_3Fe(CN)_6 + HgCl_2 \rightarrow 2Na_4Fe(CN)_5 + Hg(CN)_2$ (2) $Hg(CN)_2 + 2NaOCl \rightarrow 2NaCNO + HgCl_2$ In carrying out my invention, I employ a batch treatment process which involves first chlorinating the simple cyanides to both completely break them down and change ferrocyanides into ferricyanides. Then, I effect chlorination of the ferricyanides in a manner above indicated by, in effect, using a mercuric salt as a catalyzer.

From the standpoint of chemical material balance as to the consumption of chlorine, it appears that only one cyanide molecule is oxidized by the chlorine. The breakdown chemicals are alkali metal chloride, carbonate, formate, cynate, ammonia, carbon dioxide, nitrogen gases and ferric hydroxide. Exemplary reactions of the first operation are as follows:

(3) $Cl_2 + 2NaOH \rightarrow NaOCl + H_2O$ (4) $NaCN + NaOCl \rightarrow NaCNO + NaCl$ (5) $2NaCNO + 3NaOCl + H_2O \rightarrow 2CO_2 + N_2 + 3NaCl + NaOH$ The first reaction (3) indicates that the chlorine gas forms sodium hypochlorite which is the reacting chemical in effecting chlorination. The second reaction (4) indicates that a simple cyanide compound, such as sodium cyanide, is converted into a cyanate by chlorination. The third reaction (5) shows the further chlorination of the cyanate to carbon dioxide and nitrogen gases. It is also noted that the chlorine consumed is ultimately converted into chlorides. As to the ferrocyanide content of the batch, the first chlorination also effects a conversion of all of the ferrocyanides into ferricyanides.

As to the final reactions effected by the subsequent chlorination of the ferricyanides in the presence of mercuric salts, Reaction 1 indicates that one molecule of the cyanide has been split off from the ferricyanide by the mercury, leaving penta-cyano-ferrate and mercuric cyanide. The former is an unstable compound which may break down on its own without consuming any energy of chemical additives. In the second reaction (2), the mercuric cyanide is reconverted into mercuric chloride, while the cyanide is chlorinated in accordance with Reactions 4 and 5. Thus, the mercuric chloride is free to start a second cycle or Reaction 1, as long as the hypochlorite of Reaction 3 is available to free the mercuric cyanide, and ferricyanide is present to furnish the cyanide molecule for repeated mercuric cyanide formation. It should be noted that the reaction products of the first or preliminary chlorination of Equations 3, 4, and 5 may remain in the solution batch as they do not adversely influence the final reactions as to the iron cyanide content.

Only one mole of cyanide is chlorinated from the ferricyanide compound and the iron is finally precipitated as ferric hydroxide. Only chlorides, carbonates, formates and ammonia compounds remain in the solution. Chlorine is the only chemical consumed in the above reactions for the chlorination of the cyanides.

I have determined that a minimum quantity of mercury salts can thus be employed to decompose a relatively large quantity of iron cyanide. The reaction has been found to require agitation or stirring, at least, in the final processing (after the addition of the mercury salts) to bring the salts into contact with the iron cyanide compounds and to provide a sufficient supply of chlorine to free the mercury salts from their cyanide complex, so that they will then initiate the next cycle.

The pH has to be maintained within an alkaline range to assure that the secondary breakdown procedure of the cyanide compounds (ferricyanide) will be cyanate salts that are non-toxic and that may break-down further. One surprising result is that the above treatment of the iron cyanides can be effected selectively, along with the alkaline chlorination of the other cyanides in the same waste. First, the simple cyanides are broken down and the ferrocyanides are converted to ferricyanides by chlorination with an alkaline pH being maintained. Then, the chlorination is made effective as to the ferricyanides by the addition of a mercury salt that acts as a catalyst.

Taking into consideration all of the factors involved, including the cost of the chemicals consumed and time for reactions, I have found that about 5% of the total ferrocyanide weight is sufficient for the mercuric chloride addition. A concentration of about .02 to .50 gram per liter of mercuric chloride is sufficient in any event to keep the reaction going and complete it in a reasonable period of time.

By way of example, after the first or preliminary treatment, a waste solution may contain one gram per liter of sodium ferricyanide. For the initial alkaline chlorination reactions, I first raise the pH to from 9 to 11 by the addition of an alkaline metal hydroxide or carbonate, and then add chlorine or hypochlorite to establish oxidizing conditions. Subsequently, a mercury salt, such as mercuric chloride, is added to complete the reaction, particularly from the standpoint of the iron content. As the mercuric cyanide consumes available chlorine, I find that it is necessary to maintain an available chlorine excess by further additions, until all of the ferricyanide has been eliminated.

As previously mentioned, a small quantity of mercury salt has been found sufficient, since it will react repeatedly. I use at least .02 gram per liter of the mercury salt or about 1 to 10% of the weight of the ferricyanide to be reacted. A larger quantity of mercury salt will complete the reaction faster, since I thus reduce the number of times the same reactions have to be repeated, see (1) and (2) above.

Treating the above-mentioned exemplary content of 1 gram per liter of ferricyanide in solution, I have added .025 gram per liter of mercury salt and above 1 gram per liter of free chlorine in the form of chlorine gas or hypochlorite equivalent. This results in the completion of the reactions in about two hours at 180 degrees F. with stirring. However, at room temperature, the same reaction takes about 24 hours.

For the treatment of a solution containing 2 grams per liter of ferricyanide, the chlorine consumption is about twice as much as in the above example. However, if the quantity of mercuric chloride is doubled, the reaction time is about the same as before. If the mercuric chloride concentration is provided at .025 gram per liter, the reaction time will be about twice as long as in the above example.

It is important, from the time the mercury salt addition is made, that free chlorine should be also made available. As the chlorine is consumed, additions are made to maintain a free chlorine excess and therefore, an oxidizing potential. Lack of oxidizing conditions tends to result in the reduction of the mercury salts to a mercurous state. Since the latter are insoluble, they tend to precipitate out, so that the mercury salt additions are lost and are not available to sustain the catalytic type of reaction. Since chlorine reacts with simple (non-iron) cyanides under the conditions herein established, I preferentially first eliminate (chlorinate) the simple cyanides before I chlorinate the iron cyanides. Best results are obtained by effecting the treatment in one batch and maintaining chlorinating conditions until chemical tests indicate that the iron cyanides have been eliminated. By this selective or progressive type of an action, I avoid tying-down the mercuric cyanides by the simple cyanides and allow the mercury to perform its specialized catalytic type of function with reference to the iron cyanides (ferricyanides).

The relatively small quantity of mercury used does not have to be wasted, since it can be amalgamated on metallic copper, zinc, etc. and removed from the solution on the metal surface when the treatment is completed. My procedure effects a complete breaking-down of iron cyanide compounds, whether or not other (simple) cyanide compounds are present in the waste, and if they are present, in a progressive and selective manner as to their breakdown. The cyanide radical is chlorinized and the iron is finally precipitated as non-toxic ferric hydroxide.

What I claim is:

1. A method of conditioning waste containing cyanide compounds and at least iron cyanide which comprises, chlorinating the waste and converting the iron cyanide into an intermediate iron cyanide reaction product, and completing the chlorination of the intermediate iron cyanide in the presence of a mercury chloride catalyst into a non-toxic iron compound.

2. A method of conditioning a waste solution containing at least iron cyanide which comprises, converting the iron cyanide from a ferrocyanide into a ferricyanide, and then employing a mercury chloride compound to complete the conversion of the ferricyanide into ferric hydroxide.

3. A method of conditioning a waste solution containing at least an iron cyanide which comprises, making the waste solution alkaline and chlorinating the iron cyanide to an intermediate iron cyanide reaction product, and completing the alkaline chlorination of the intermediate iron cyanide reaction product by employing a mercuric chloride salt.

4. A method of conditioning a waste solution containing at least iron cyanide which comprises, alkaline chlorinating the solution and converting the iron cyanide to an intermediate iron cyanide product, and completing the chlorination of the intermediate iron cyanide product by adding a mercuric chloride salt to the solution and maintaining an excess of chlorine until the chlorination is completed.

5. A method as defined in claim 4 wherein, the mercuric chloride salt is reacted with the intermediate iron cyanide product to form a penta-cyano-ferrate and mercuric cyanide, and the mercuric cyanide is reacted with chlorine to reconvert it into a salt.

6. A method as defined in claim 5 wherein the reactions of claim 5 are repeated until all intermediate iron cyanide products have been converted into non-toxic iron compounds.

7. A method as defined in claim 6 wherein the metal of the mercuric chloride salt is recovered from the waste solution after the completion of the defined conditioning by amalgamating it with a metal.

8. A method of conditioning a waste containing simple cyanide compounds in the nature of alkaline cyanides and iron cyanides which comprises, making the waste into an alkaline solution and chlorinating the waste solution to convert the simple compounds into non-toxic compounds and the iron cyanide into an intermediate iron cyanide reaction product, after a completion of the first step providing a mercuric chloride salt in the waste solution, and finally completing the chlorination of the intermediate iron cyanide into a non-toxic iron compound.

9. A method as defined in claim 8 wherein the waste solution is agitated at least after the mercuric chloride salt is added and during the completion of the chlorination.

10. A method as defined in claim 9 wherein during conditioning chlorine is added to the waste solution and is maintained in excess therein.

11. A method as defined in claim 9 wherein a concentration of about .02 to .50 gram per liter of mercuric chloride salt is employed in completing the chlorination of the intermediate iron cyanide reaction product.

12. A method of conditioning waste containing simple cyanide compounds in the nature of alkaline cyanides and iron cyanides which comprises, making up a batch solution of the waste as an alkaline solution and first chlorinating the waste of the solution to convert the simple cyanide compounds into non-toxic products and the iron cyanides to intermediate iron cyanides, completing the chlorination of the intermediate iron cyanides by adding a mercuric salt in the nature of a chloride to the solution, agitating the waste solution during the reactions, and maintaining a chlorine excess in the waste solution and until its full iron cyanide content has been converted into a non-toxic iron compound.

13. A method as defined in claim 12 wherein the alkaline pH of the waste solution is maintained at about 9 to 11 by the addition of an alkaline metal hydroxide or carbonate.

14. A method as defined in claim 12 wherein at least .02 gram per liter of the mercuric salt and about 1 to 10% of the weight of the intermediate iron cyanides is employed in completing their chlorination.

15. A method as defined in claim 12 wherein the waste solution is maintained at a temperature of at least about 180 degrees and is stirred during the conditioning.

16. A method as defined in claim 12 wherein the process is selectively and progressively effected to first convert the simple cyanides into non-toxic reaction products and ferrocyanide into ferricyanide, and is thereafter completed by the addition of the mercuric salt and the chlorination of the ferricyanide in the presence of the mercuric salt into non-toxic reaction products.

17. A method as defined in claim 16 wherein, the mercuric salt is employed in a continuous manner to first form an unstable penta-cyano-ferrate, and the mercuric salt is employed to repeat the process until the full content of the ferricyanide has been converted into non-toxic products.

18. A method as defined in claim 17 wherein the mercuric salt is recovered after the conditioning of the waste by amalgamating it on a metal of the class of copper and zinc and is removed from the waste solution on the surface of the metal.

References Cited in the file of this patent
UNITED STATES PATENTS 1,614,523   Cooper _____ Jan. 18, 1927

OTHER REFERENCES

"Disposal of Plating Room Waste," Dodge et al., Plating, June 1951, pages 561–586, page 571 particularly relied on.

Rudolfs: "Industrial Wastes," Reinhold Publishing Co. (1953), pages 299–307.

UNITED STATES PATENT OFFICE
CERTIFICATE OF CORRECTION

Patent No. 2,981,682                 April 25, 1961

Leslie E. Lancy

It is hereby certified that error appears in the above numbered patent requiring correction and that the said Letters Patent should read as corrected below.

Column 2, line 65, for that portion of the formula reading "NaOH" read -- 2NaOH --.

Signed and sealed this 19th day of September 1961.

(SEAL)
Attest:

ERNEST W. SWIDER
Attesting Officer

DAVID L. LADD
Commissioner of Patents
USCOMM-DC